United States Patent
Houlihan

[11] Patent Number: 6,039,067
[45] Date of Patent: Mar. 21, 2000

[54] SELECTABLE CONTROL ENERGY AND WATER CONSERVATION SYSTEM

[76] Inventor: John A. Houlihan, 912 Queens Ct., Santa Maria, Calif. 93454

[21] Appl. No.: 09/173,879

[22] Filed: Oct. 16, 1998

[51] Int. Cl.[7] .................................................. F16K 49/00
[52] U.S. Cl. ...................................... 137/337; 137/624.12
[58] Field of Search ..................................... 137/337, 565, 137/624.12; 417/12, 32

[56] References Cited

U.S. PATENT DOCUMENTS

| | | | |
|---|---|---|---|
| 4,160,461 | 7/1979 | Vataru | 137/337 |
| 4,606,325 | 8/1986 | Lujan, Jr. | 126/362 |
| 4,697,614 | 10/1987 | Powers et al. | 137/337 |
| 4,750,472 | 6/1988 | Fazekas | 126/351 |
| 4,870,986 | 10/1989 | Barret et al. | 137/119 |
| 4,917,142 | 4/1990 | Laing et al. | 137/337 |
| 4,930,551 | 6/1990 | Haws | 137/337 |
| 4,936,289 | 6/1990 | Peterson | 126/362 |
| 5,009,572 | 4/1991 | Imhoff | 417/32 |
| 5,042,524 | 8/1991 | Lund | 137/337 |
| 5,105,846 | 4/1992 | Britt | 137/337 |
| 5,205,318 | 4/1993 | Massaro | 137/337 |
| 5,261,443 | 11/1993 | Walsh | 137/337 |
| 5,339,859 | 8/1994 | Bowman | 137/337 |
| 5,351,712 | 10/1994 | Houlihan | 137/337 |
| 5,511,579 | 4/1996 | Price | 137/337 |
| 5,564,462 | 10/1996 | Storch | 137/337 |
| 5,775,372 | 7/1998 | Houlihan | 137/624.12 |

*Primary Examiner*—John Fox

[57] ABSTRACT

The system is unique in that a structure's plumbing lines are effectively routed, to stop energy and water waste, while adding little to construction cost. Water pressure to hot water supply (50) is controlled through a selectable flow control valve (10). A hot water manifold (3) and check valves 42 and 43 produce a dual line connection, between hot water manifold (3) and the hot water use area. In the water saver mode, positioning selectable flow control valve (10) causes pump (4) to draw water from distribution conduit (6), through selectable flow control valve (10), through cold water manifold (12) and solenoid valve (37) to hot water supply (50). Pump (4) causes hot water to fill distribution conduit (6), to the hot water use area. This circulation delivers hot water to replace water standing in the line. Circulation period is determined by controller (22). When selectable flow control valve (10) is positioned to the use mode, supply pressure at cold water conduit (28) is applied through selectable flow control valve (10), then via cold water manifold (12), to hot water supply (50). Positioning selectable flow control valve (10) to the energy saver mode causes, cold water pressure to be interrupted to hot water supply (50) and directed through feedback conduit (72) and conduit (71), to a junction down stream from hot water manifold (3). Supply pressure forces hot water towards open hot water outlet (45), thus all hot water delivered from hot water manifold (3) is utilized.

15 Claims, 2 Drawing Sheets

SELECTABLE CONTROL ENERGY AND WATER CONSERVATION SYSTEM

BACKGROUND FIELD OF THE INVENTION

This invention relates to a hot and cold water delivery system, more particularly to a water saving, energy conserving system that is sufficiently flexible in design, to be conveniently installed in a variety of residential or commercial structures.

DESCRIPTION OF THE PROBLEM AREA

In a conventional plumbing system, which includes a water heating tank, it is a well known fact that, after every use, hot water is retained in the line between the hot water supply and the outlet, and it cools. Later this cooled water is wasted down the drain, waiting for hot water to arrive at the outlet; water and the energy to heat that water are wasted. In order to solve the singular problem of water waste, hot water recirculating systems are suggested, but unfortunately, no energy is saved.

Hot water recirculation systems require additional piping to complete a loop from the furthest hot water outlet, returning to the hot water supply. In structures where hot water use areas are located in different directions from the hot water supply location, return loops from each use area are required. Return pipe loops contribute to the loss of additional heat, because of the increased volume of water cooling and the increased cooling surface of the added lengths of pipe; even insulated pipes relinquish their heat. Sensors react to water cooling in the lines, triggering frequent pump operation. Public Utilities rate recirculating pump systems as net energy consumers and during the cooler months of the year, energy consumption and costs can rise appreciably.

When closely considered, the type of recirculating system designed to insure instant hot water at any point along a hot water service conduit conserves water, but it is not energy efficient. Regularly re-circulating cooling water back to the water heating unit results in a wasteful condition. The water transported between the furthest use point and the water heating unit, although lower in temperature than that of the hot water being delivered, still contains a considerable amount of heat. Thus, the amount of heated water subjected to cooling in the line is approximately double that of the same structure without recirculation. The price paid for the conservation of water would be prohibitively high, especially for the 33.5 million households that the U.S. Census Bureau reports utilize electric water heating.

BRIEF DESCRIPTION OF PRIOR ART

Vataru, et al U.S. Pat. No. 4,160,461 Jul. 10, 1979

Vataru shows a water saving system. This system fails to address the problem of lost energy due to hot water cooling in the plumbing lines between hot water usage cycles. He does not address the energy loss problem of hot water left to cool in the lines. No indication is given that the system has the built in design or flexibility to accept the addition of any type of compatible unit, subassembly or segment, which would expand the system to include an energy saving capability.

Lujan U.S. Pat. No. 4,606,325 Aug. 19, 1986

Lujan, shows a hot water recirculation system. He does not address the energy loss problem of hot water left to cool in the lines. No indication is given that the system has the built in design or flexibility to accept the addition of any type of compatible unit, sub-assembly or segment, which would expand the system to include an energy saving capability.

Powers & Powers U.S. Pat No. 4,697,614 Oct. 6, 1987

Powers shows a water conservation system. This system requires an installation below each sink taking up most of the storage space beneath the sink. It does not address the problem of energy loss due to hot water cooling in the lines. No indication is given that the system has the built in design or flexibility to accept the addition of any type of compatible unit, sub-assembly or segment, which would expand the system to include an energy saving capability.

Frazekas U.S. Pat. No. 4,750,472 Jun. 14, 1988

Frazekas shows a hot water recirculation system. He does not address the energy loss problem of hot water left to cool in the lines. No indication is given that the system has the built in design or flexibility to accept the addition of any type of compatible unit, sub-assembly or segment, which would expand the system to include an energy saving capability.

Barrett, et al U.S. Pat No. 4,870,986 Oct. 3, 1989

Barrett shows a system for dispensing liquid at a desired temperature. This system is primarily one for moderating temperature and controlling flow at system outlets. He does not address the energy loss problem of hot water left to cool in the lines. No indication is given that the system has the built in design or flexibility to accept the addition of any type of compatible unit, sub-assembly or segment, which would expand the system to include an energy saving capability Laing, et al U.S. Pat. No. 4,917,142 Apr. 17, 1990

Laing shows a hot water recirculation system. He does not address the energy loss problem of hot water left to cool in the lines. No indication is given that the system has the built in design or flexibility to accept the addition of any type of compatible unit, sub-assembly or segment, which would expand the system to include an energy saving capability.

Haws—U.S. Pat. No. 4,930,551 Jun. 5, 1990

Haws shows a hot water recovery system with a water heater apparatus having a closed cylindrical cylinder within the heater tank.

This system cannot be utilized effectively with a conventional water heater. He does not address the energy loss problem of hot water left to cool in the lines. No indication is given that the system has the built in design or flexibility to accept the addition of any type of compatible unit, sub-assembly or segment, which would expand the system to include an energy saving capability.

Peterson U.S. Pat. No. 4,930,551 Jun. 26, 1990

Peterson shows a system for controlling the recirculation of a hot water distribution system. He does not address the energy loss problem of hot water left to cool in the lines. No indication is given that the system has the built in design or flexibility to accept the addition of any type of compatible unit, sub-assembly or segment, which would expand the system to include an energy saving capability.

Imhoff U.S. Pat. No. 5,009,572 Apr. 23, 1991

Imhoff shows a water conservation system installed inside a standard bathroom vanity. This system requires a pump unit at the hot water outlets and the need for an electrical outlet at each use point. He does not address the energy loss problem of hot water left to cool in the lines. No indication is given that the system has the built in design or flexibility to accept the addition of any type of compatible unit, sub-assembly or segment, which would expand the system to include an energy saving capability.

Lund U.S. Pat. No. 5,042,524 Aug. 27, 1991

Lund shows a demand recovery hot water system. This system does not address the problem of lost energy due to hot water cooling in the plumbing lines, between hot water usage cycles.

No indication is given that the system has the built in design or flexibility to accept the addition of any type of compatible unit, sub-assembly or segment, which would expand the system to include an energy saving capability.

Hass U.S. Pat. No. 5,050,062 September 1991

Hass shows a water conservation system. He does not address the energy loss problem of hot water left to cool in the lines. No indication is given that the system has the built in design or flexibility to accept the addition of any type of compatible unit, sub-assembly or segment, which would expand the system to include an energy saving capability.

Britt U.S. Pat. No. 5,105,846 Apr. 21, 1992

Britt shows a water saving system. This system is designed to prevent water waste but it does not address the problem of lost energy due to hot water cooling in the plumbing lines, between hot water usage cycles. No indication is given that the system has the built in design or flexibility to accept the addition of any type of compatible-unit, sub-assembly or segment, which would expand the system to include an energy saving capability.

Massaro, et al U.S. Pat. No. 5,205,318 Apr. 27, 1993

Massaro shows a water saving system. This system requires installation of a manifold unit beneath the sink, taking up a large amount of space. Once usage is completed the problem still exists of heated water cooling in the lines. No indication is given that the system has the built in design or flexibility to accept the addition of any type of compatible unit, sub-assembly or segment, which would expand the system to include an energy saving capability.

Walsh—U.S. Pat. No. 5,261,443 Nov. 16, 1993

Walsh shows a water saving recirculating system. He does not address the energy loss problem of hot water left to cool in the lines. No indication is given that the system has the built in design or flexibility to accept the addition of any type of compatible unit, sub-assembly or segment, which would expand the system to include an energy saving capability.

Houlihan, U.S. Pat. No. 5,351,712 Oct. 4, 1994

Houlihan shows a hot water recovery system, requiring vent-relief valves at each use point and is not easily adaptable to varying conditions or user's conservation goals.

Lund U.S. Pat. No 5,385,168 Feb. 14, 1995

Lund shows a temperature controlled water saving, hot water recirculation system. He does not address the energy loss problem of hot water left to cool in the lines. No indication is given that the system has the built in design or flexibility to accept the addition of any type of compatible unit, sub-assembly or segment, which would expand the system to include an energy saving capability.

Bowman U.S. Pat. No. 5,452,740 Sep. 26, 1995

Continuation in part of U.S. Pat. No. 5,339,859. Bowman shows a water conservation system. He does not address the energy loss problem of hot water left to cool in the lines. No indication is given that the system has the built in design or flexibility to accept the addition of any type of compatible unit, sub-assembly or segment, which would expand the system to include an energy saving capability.

Price U.S. Pat. No. 5,511,579 April 1996

Price shows a thermal sensitive recirculation water conservation system. He does not address the energy loss problem of hot water left to cool in the lines. No indication is given that the system has the built in design or flexibility to accept the addition of any type of compatible unit, sub-assembly or segment, which would expand the system to include an energy saving capability.

Storch—U.S. Pat. No. 5,564,462 Oct. 15, 1996

Storch shows a water saving delivery system. He does not address the energy loss problem of hot water left to cool in the lines. No indication is given that the system has the built in design or flexibility to accept the addition of any type of compatible unit, sub-assembly or segment, which would expand the system to include an energy saving capability.

Houlihan, U.S. Pat. No. 5,775,372 Jul. 7, 1998

Houlihan shows a water and energy conservation system, for new and existing structures that is a mix of hard wire and radio control command signals. He does not show a convenient manual control utilizing any type of multi-state selection flow control valve to control and direct flow.

OBJECTS AND ADVANTAGES

Accordingly, one object of the invention is to provide a convenient and affordable, selectable flow control system, capable of saving energy and water.

Another object of the invention is to provide a convenient and affordable energy and water and energy saving system, adaptable to the conservation goals and economic considerations of the user.

Another object is to provide a system which delivers hot water on demand without having to waste water down the drain, waiting for hot water to arrive at the hot water outlet.

Another object is to provide a system that utilizes all the delivered hot water from the hot water supply, eliminating the heat loss of water left cooling in the plumbing lines, after each use.

Another object is to provide a water saving system that can be used with any type of water heating apparatus, including solar.

Another object is to provide an energy saving system that can be used with any type of water heating apparatus, including solar.

Another object of the invention is to provide an energy and water savings system that may be configured for and installed in new construction with a minimum and inexpensive alteration to a standard plumbing plan.

Another advantage is that where budgets are limited or energy saving is the only intended conservation goal, an alternative to installing a complete system is that the energy saver segment of the system can be installed to operate independently, at a lower cost to the consumer.

Another advantage is that where budgets are limited or only water saving is the intended conservation goal, an alternative to installing a complete system is that a water saver segment can be installed to operate independently, at a lower cost to the consumer.

Another advantage is that when only one of the system's segments is originally installed, the opposite segment can be conveniently added at a later date to complete the system.

Another object of the invention is to provide an energy saving segment and/or water saving segment, or a complete system that may be configured for and installed in an add on structure, to an existing structure.

Another advantage of the system is that the heating load of the hot water supply is reduced, increasing its service life.

Another advantage is that in a structure that has been properly plumbed, property lessees could install a system in a rented property and be able to easily disconnect the system for equally easy re-installation at a new location, allowing lessees to benefit from water and energy bill savings, in a property owned by others.

Another advantage is that the practice of sacrificing interior space of a dwelling to locate a hot water supply, in order to shorten hot water service lines can be changed. In the system no hot water is left to cool in the lines so the hot water supply could be located in the basement, garage, or in an outside enclosure, in warm climates; increasing interior living space, without increasing water heating costs.

These and other objects and advantages of the present invention will become apparent from a consideration of the following detailed description and the accompanying drawings.

SUMMARY

According to the present invention there is provided a water and energy conservation system which solves the problem of water waste and energy loss, in a manner unknown heretofore.

The system is unique in that a structure's plumbing lines are economically altered and interfaced with a flow control unit, to conserve energy and water. Water pressure to the hot water supply is controlled through a selectable flow control valve. A hot water manifold and a check valve combination are combined to produce a dual line connection, between the manifold and the hot water use area.

In the water saver mode, the positioning of the flow control valve causes a pump to draw water, out of a hot water distribution conduit, through the flow control valve through an inlet conduit to a cold water manifold and then to the cold water inlet of a hot water supply. Pump action forces hot water to the use area, from the hot water supply, through the hot water manifold and the hot water distribution conduit. Electrical control circuits are adjusted to de-energize, when the hot water reaches the use point. When the selectable flow control valve is positioned to the use mode, cold water pressure is then directed through the selectable flow control valve, via the cold water manifold, to the hot water supply. When the selectable flow control valve is positioned to the energy saver mode, the cold water supply pressure is directed away from the cold water inlet, of the hot water supply and cold water pressure is directed through a feedback conduit to the hot water supply end of the distribution conduit, at a point close down stream from the outlet of the hot water manifold. Hot water, under cold water supply pressure, is forced towards the open hot water outlet. Thus the hot water delivered to the distribution conduit is utilized, leaving no hot water in the conduit, eliminating this energy waste.

DESCRIPTION OF PREFERRED EMBODIMENT

Figure 1:
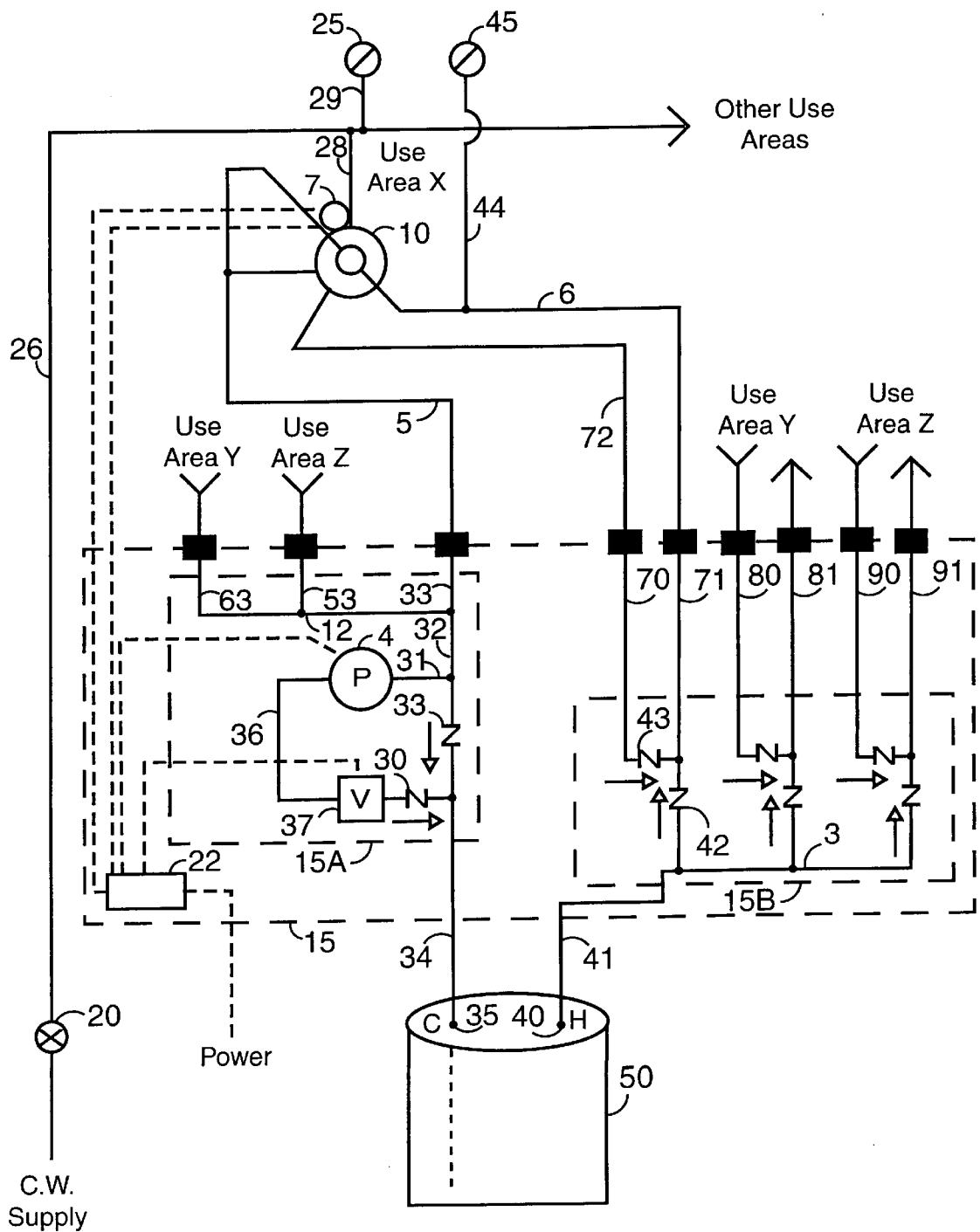
FIG. 1 Shows a flow diagram, for a water and energy conservation system as described herein.

Referring now to FIG. 1.

The selectable control energy and water conservation system is configured as a unit, for use in a structure whose conduits have been specifically and economically routed to interface correctly with the system's flow control components. It may be wall mounted or free standing. Its most energy efficient location would be in close proximity to the structure's hot water supply. However, it can be located at a more convenient space in the structure without altering its operation or manufacture.

A water saver segment 15A of a flow control unit 15 is configured to function with each use area in the structure, where a hot water outlet is located. Use area X is supplied hot water through a hot water distribution conduit 6 which may be placed in fluid communication, through a selectable flow control valve 10, with a cold water inlet conduit 5, branched from a cold water manifold 12. The flow path is opened or closed, by selectable flow control valve 10. This permits the water standing in hot water distribution conduit 6, which would normally be wasted down the drain, waiting for hot water to arrive at a use point, to be re-directed back to water saver segment 15A. A pump 4 circulates cold water from distribution conduit 6 to manifold 12, then to a hot water supply 50, and forces hot water through a hot water manifold 3, to distribution conduit 6, to complete the loop, established by the positioning of selectable flow control valve 10.

An energy saver segment 15B of flow control unit 15 is configured so that, in the final stage of the hot water use cycle, selectable flow control valve 10 is positioned to allow pressure, from a cold water supply conduit 28, to be re-directed, back through a feedback conduit (72) to a junction, close down stream from the outlet of hot water manifold 3; at the same time interrupting cold water supply pressure to hot water supply 50. This pressurized cold water forces hot water in a conduit 71 and in distribution conduit 6, towards a hot water outlet 45. In this mode all the hot water having been delivered from hot water manifold 3 is consumed and fresh cold water refills distribution conduit 6 and conduit 71. This eliminates the energy loss from hot water which, in a standard plumbing system, would be trapped between outlet 45 and hot water supply 50, and left to cool.

In the off condition, flow control components of water saver segment 15A are in the de-energized state. A flow controller 22 is in a stand-by mode, ready to direct power to pump 4 and a normally closed-to-flow solenoid valve 37. In the off mode there is no cold water pressure applied to a cold water inlet 35 of water supply 50.

Selectable flow control valve 10 has two members. A fixed supply member with multiple inlet and outlet ports, through which system water pressure is furnished. A moveable, direction control member, with multiple inlet and outlet ports, which are selectively connected to and disconnected from the cold water supply port of the fixed member. Inlet and outlet ports are selectively aligned in each position, to give selectable flow control valve 10 its directional and flow control capabilities.

The control function of selectable flow control valve 10 is as follows. At the twelve o'clock, static or off position, water pressure from cold water supply conduit 28 is not in fluid communication with any other conduit, and there is no fluid communication through selectable flow control valve 10.

In the ten o'clock position, water saver mode, water pressure from conduit 28 remains closed off to the moveable member. In this position a fluid continuity path is established between inlet conduit 5 and hot water distribution conduit 6. A mechanical activation device, on the moveable member of selectable flow control valve 10, closes an electrical switch 7, which activates control elements of controller 22, causing electrical power to be supplied to pump 4 and normally closed-to-flow solenoid valve 37. In a closed loop, pump 4 circulates cold water in the conduits to cold water inlet 35 of hot water supply 50, forcing hot water from a hot water outlet 40, until hot water is available at a hot water service conduit 44. Cycle duration is controlled by controller 22.

When the moveable member of flow control valve 10 is set to the nine o'clock position use mode, water pressure from conduit 28 is placed in fluid communication with inlet conduit 5, through flow control valve 10. Cold water supply pressure is now directed to hot water supply 50, through cold water manifold 12, at inlet 35, of hot water supply 50.

In the seven o'clock energy saver position water pressure from conduit 28 is redirected and is placed in fluid communication with feed back conduit 72, through flow control valve 10. Supply pressure to inlet 35 of water supply 50 is interrupted. Supply pressure through conduit 72 is now directed to output of hot water manifold 3.

Thus, the twelve o'clock position is the off mode. The ten o'clock position is the water saver mode, the nine o'clock position is the use mode and the seven o'clock position is the energy saver mode. In alternate valve configurations the positioning and orientation can be different.

Operation

In the off mode, cold water supply pressure is applied through a shut-off valve 20, via a main cold water supply conduit 26 to conduit 28 and a service conduit 29 and to a cold water outlet 25. Cold water supply pressure to hot water supply 50 is interrupted. There are no coupled flow paths through flow control valve 10.

Water Saver Cycle—Selectable flow control valve 10 is positioned, by the user, from the off mode twelve o'clock position, to the water saver mode ten o'clock position. This places cold water inlet conduit 5 in fluid communication with hot water distribution conduit 6. Electrical switch 7, attached to flow control valve 10, is closed by a mechanical activation device, which is mounted on the moveable member. Pump 4 is energized and remotely actuated, normally closed-to-flow, solenoid valve 37 is energized to the open-to-flow position; both are controlled by a timing circuit in controller 22. Energized pump 4 operates in a closed conduit loop between flow control valve 10 and hot water supply 50.

Pump 4, draws cold water from hot water distribution conduit 6 through flow control valve 10 into conduit 5, to one inlet of cold water manifold 12. Flow continues from the outlet of manifold 12, via a conduit 32 to the inlet port of energized pump 4. The outlet port of pump 4 is in fluid communication with a conduit 36, and solenoid valve 37, now energized to the open-to-flow condition. Flow is then through a back flow control 30 and a conduit 34, to cold water inlet 35 of hot water supply 50. Circulation action of pump 4 forces hot water out of hot water supply 50 at outlet 40, thence via a hot water supply conduit 41, to the inlet of hot water manifold 3. The hot water flow path is completed via a back flow control 42 and conduit 71 to distribution conduit 6, completing a closed loop back to flow control valve 10. Pump 4 circulates water in a closed loop, drawing cold water to inlet 35 of supply 50, forcing hot water, from outlet 40. The running time of pump 4 is determined by the distance to the use point and is controlled by an adjustable circuit of controller 22. Hot water is thus made available at use point X without wasting water down the drain.

Use Cycle—The user next operates selectable flow control valve 10 from the water saver mode to the use mode, being the nine o'clock position. Electrical switch 7 opens, pump 4 and solenoid valve 37 are de-energized and the fluid communication between inlet conduit 5 and distribution conduit 6 is interrupted. Supply pressure is now applied through flow control valve 10, from conduit 28 to cold water inlet conduit 5, to an inlet at cold water manifold 12, and thence to a conduit 32. Flow continues through a back flow control 33 and a conduit 34, to inlet 35 of hot water supply 50. The system operates as a standard hot water distribution system, supplying hot water to use point X. Hot water under supply pressure flows from hot water supply 50, at outlet 40, then via conduit 41 to hot water manifold 3. The flow path to hot water outlet 45, is completed through hot water manifold 3, back flow control 42, conduit 71, and conduits 6 and 44.

Energy Saver Cycle—At the user's discretion, the user operates flow control valve 10 to the seven o'clock, energy saver position. Cold water supply pressure at conduit 28 is now interrupted to conduit 5, interrupting cold water supply pressure to hot water supply 50. As the result of positioning flow control valve 10, the cold water supply pressure is now directed through feed back conduit 72 and conduit 70, through a back flow control 43, to a junction, at the down stream outlet of back flow control 42. Cold water supply pressure now forces hot water, in conduit 71 and distribution conduit 6, to open hot water outlet 45, at use point X. Back flow control 42 prevents back flow into conduit 41 and hot water supply 50. When the hot water becomes too cool, the user closes the outlet. No hot water is left to cool in the conduits, because it has been displaced by cold water.

Additional use points, Y and Z would be branched from cold water manifold 12 at conduits 63 and 53 and from hot water manifold 3 at conduits 80, 81 and 90, 91 as shown in FIG. 1. Each would be configured as use point X. Each would have a separate selectable flow control valve.

Figure 2:
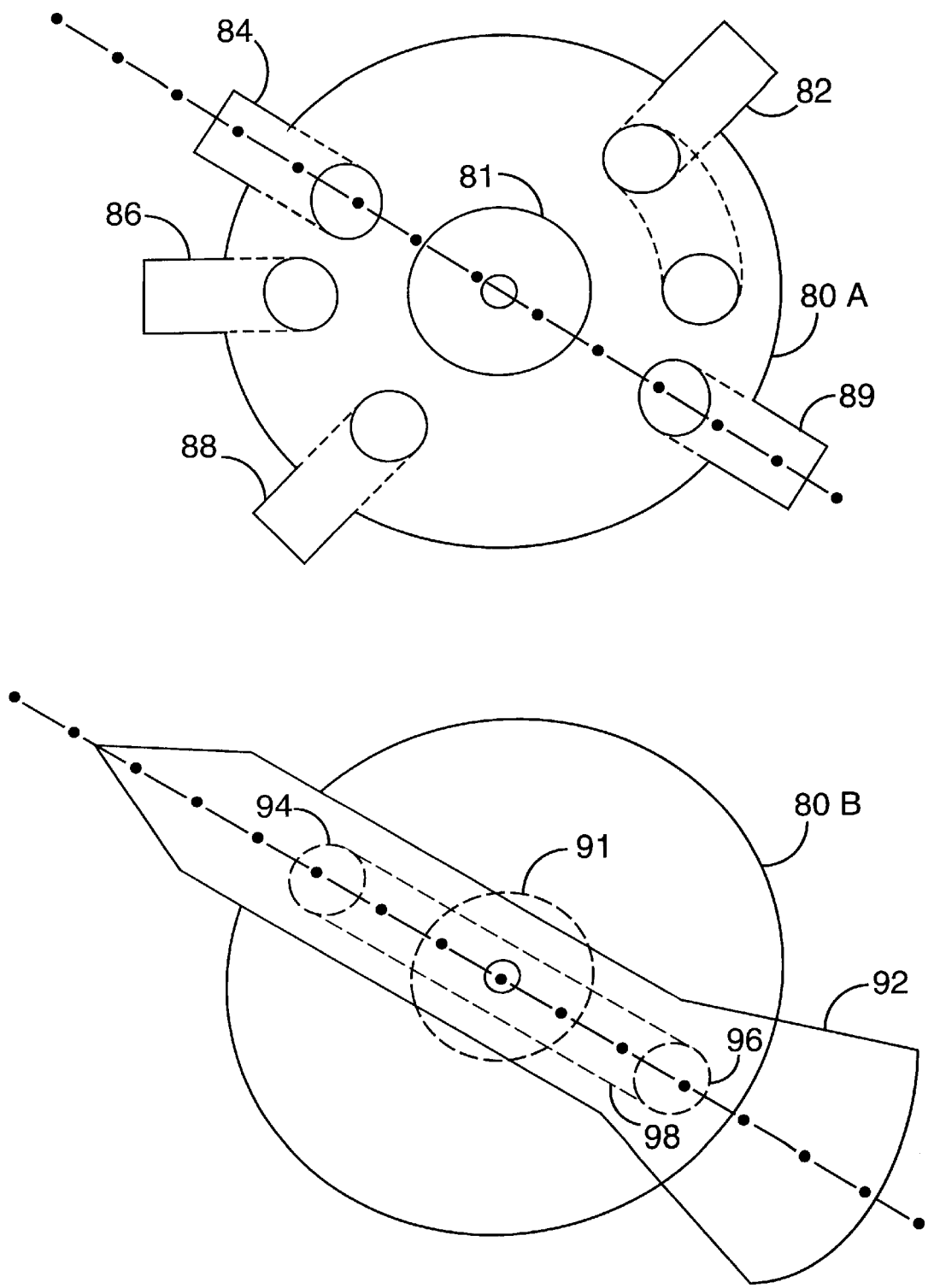
FIG. 2 Shows a selectable flow control valve, configured with a disk interface between a fixed member and a moveable member.

Turning Now to FIG. 2.

A selectable flow control valve has a fixed number 80A with a disk interface and a moveable member 80B with a disk interface. Fixed member port 82 connects to cold water supply conduit 28. Fixed member port 84 and port 86 connect to cold water inlet conduit 5. Fixed member port 88 connects to feed back conduit 72 and port 89 connects to hot water distribution conduit 6. A recessed area 81 is sized to accept a slightly smaller extended circular, body member 91, of moveable member 80B, to align the members properly. Moveable member 80B is comprised of a handle 92 secured to moveable member 80B. An inlet port 96 and an outlet port 94 are in fluid communication through an internal channel 98. Extended circular, body member 91 mates with recessed area 81. 'O' rings, washers and gaskets would be effectively arranged to prevent leakage, There are several methods which may be selected to enclose the members to provide the necessary restraints on the components, to withstand normal supply pressures and prevent leakage from the interface disks and between the ports.

Ramifications

Thus the reader will see that the selectable control energy and water conservation system provides a flexible energy and water conservation apparatus, adaptable to a user's economic capabilities and the availability and location of space within a structure.

One ramification is that an audio and/or visual devices may be incorporated at each use area, to indicate the completion of the water saver cycle.

Another ramification is that a thermal switch can be incorporated at each hot water use point, to provide, in the cool state, electrical continuity from the micro switch to the pump and solenoid valve; thus eliminating the need for a timed control.

Another ramification is that there are several possible alternate configurations for the selectable flow control valve, including an integrated model, where the water temperature and volume fixture and the directional flow control capabilities are combined.

Another ramification of the system is that, where pressure levels permit, a spring loaded back flow control could be substituted for the normally closed-to-flow solenoid valve.

Another ramification of the system is that one or more conduits could be added to the flow control unit, to service additional water use areas.

Another ramification of the system is it may be adapted and expanded for installation at multi use facilities such as motels, hotels, military quarters, college dormitories, etc.

Another ramification of the system is it may be configured as a must activate system, which will not deliver hot water until the system is activated. A room key, magnetic coded strip card or other secure device could be employed to limit access.

Another ramification is that the system may be configured as a must-operate system, which will shut off delivery of hot water to a specific use point after a fixed period of time, to avoid wasteful, excessive running of hot water.

Another ramification is that an agreed upon use-time can be configured and programmed into the controller adjusted for an agreed amount of time for each specific use point, avoiding the added water and energy waste, of too long showers; voluntarily limiting the total time of the hot water use cycle, contributes to additional water and energy savings.

Another ramification is that it may be configured for programmable control, utilizing remote control command devices including radio frequency units, associated with one of several marketed home security systems, such as, but not limited to, Radio Shack, IBM, ADT, Square D, Leviton, Advance Control Technologies, or Heath.

Another ramification is that it may be configured with a command system that has push button controls directly wired into the structure, establishing electrical continuity between the hot water use areas and the water saver segment.

Another ramification is that the system may be configured with one, two, or three separate diverter valves, the first to control the water saver cycle, the second to control the use cycle and the third to control the energy saver cycle. The need for a selectable flow control valve is thereby eliminated.

Another ramification is that the system's selectable flow control valve may be configured with one of several interfaces between the fixed member and the moveable member, including but not limited to a disk interface, a slide interface or a cylindrical interface.

Another ramification is the system may be configured, in the water saver mode, to direct water standing in the lines to a storage tank for later use by the user, thus eliminating the need for a pump and a solenoid valve.

The present disclosure includes that contained in the appended claims as well as that of the foregoing description. It is understood that the present disclosure of the preferred forms has been made only by way of example. Although preferred and alternate embodiments of the present invention have been disclosed above, it will be appreciated that numerous alterations and modifications thereof will no doubt become apparent to those skilled in the art, after having read the above disclosures. It is therefore intended that the following claims be interpreted as covering all such alterations and modifications as fall within the true spirit and scope of the invention.

I claim:

1. A plumbing system having a pressurized cold water supply, a hot water supply means, a plurality of cold water outlets, a plurality of hot water outlets, a cold water supply conduit to furnish cold water supply pressure to said hot water supply means, a hot water supply conduit for the purpose of furnishing hot water from said hot water supply means, to said hot water outlets, a main cold water supply conduit for furnishing cold water to said cold water outlets, a water and energy conservation system for supplying hot water on demand, without wasting water down the drain waiting for hot water and for utilizing the hot water delivered from said hot water supply means so that no hot water is left to cool in the plumbing lines, configured so as to be capable of segmentation, for independent operation as a water saver segment only or as an energy saver segment only, comprising in combination:

(a) a power source;

(b) a programmable power controller means, for distributing power to selected components;

(c) a power control means, to apply and interrupt power;

(d) a pump;

(e) a selectable flow control means, for directing and controlling flow;

(f) a flow control unit, comprising a water saver segment including a multi-port cold water manifold, one inlet port of said cold water manifold coupled to a cold water inlet conduit, and having a single outlet port in fluid communication, at a tee junction, with a cold water outlet conduit to said hot water supply means through a back flow control means and with the inlet port of said pump, with the output port of said pump in fluid communication with the inlet of a normally closed-to-flow solenoid valve, and the outlet side of said solenoid valve in fluid communication, with a tee junction, in close proximity to the cold water inlet of said hot water supply means, to direct cold water supply pressure to said hot water supply means, and to direct cold water, circulated by said pump, to said hot water supply means, and;

(g) an energy saver segment, including a multi-port, hot water manifold, an inlet port of said hot water manifold in fluid communication with the outlet of said hot water supply means, and an outlet port of said hot water manifold, in fluid communication with a hot water distribution conduit, to furnish hot water to each use area;

(h) said hot water distribution conduit, with one end in communication with said outlet of said hot water manifold and the opposite end in fluid communication with its associated use area, branching at a tee junction, and coupling a hot water service conduit to said hot water outlet and coupling said distribution conduit, to a hot water inlet port of said selectable flow control means;

(i) said cold water inlet conduit, having one end in fluid communication with said cold water manifold, and the other end in fluid communication, and branching at a tee junction, coupled to a pair of cold water outlet ports, of said selectable flow control means;

(j) said selectable flow control means, with a fixed member having one inlet port in fluid communication with said cold water supply conduit and said hot water inlet port in fluid communication with said hot water distribution conduit and having said pair of cold water outlet ports in fluid communication with said cold water inlet conduit, and having a third outlet port in fluid communication, through a cold water feed-back conduit, to a tee junction in close proximity to said hot water outlet of said hot water manifold and;

(k) said selectable flow control means having a moveable member, having a mechanical activation means attached, for closing and opening said power control means, with an internal flow channel which can be positioned for selectively opening and closing flow paths between input ports and output ports, for the purpose of completing and/or interrupting flow between associated conduits, which are connected to and in fluid communication with said selectable flow control means;

(l) a first back flow control means to limit back flow to said hot water supply means;

(m) a second back flow control means to limit back flow through said cold water feed back conduit;

(n) a third back flow control means to protect said normally closed-to-flow solenoid valve and said pump against any harmful effects of back flow;

(o) a fourth back flow control means to help direct flow during the operation of said pump.

2. A water and energy conservation system according to claim 1, wherein a plurality of visual and/or audio signaling means are included for the purpose of alerting the system user to the operating condition of said water and energy conservation system.

3. A water and energy conservation system according to claim 1, where a flow control unit is initially configured for independent operation as an energy saver segment, or a water saver segment, to which the opposite segment may later be conveniently added, thus making up a complete water and energy conservation system.

4. A water and energy conservation system according to claim 1, wherein said selectable flow control means is combined with a temperature and volume control means, to comprise a single device for controlling all aspects of flow, at a use point.

5. A water and energy conservation system according to claim 1, wherein the system may be configured in a manner that makes an activate signal mandatory, before the system will permit hot water to be delivered to any outlet.

6. A water and energy conservation system according to claim 1, having an expanded configuration for installation in a multi unit complex such as motels, hotels, military quarters, college dormitories, or other multiple use point structures.

7. A water and energy conservation system according to claim 1, wherein electrical power is applied by a separate power control means, installed at the use area, which is in electrical continuity with said flow control unit, eliminating said power control means, activated by the positioning of said moveable member of said selectable flow control means.

8. A water and energy conservation system according to claim 1, is configured so that power is controlled by a power control means which may be activated by a remote control means, a radio control means, or both, available through one of several home security systems presently on the market, utilizing programmable command signals that are super imposed on a structure's electrical wiring.

9. A water and energy conservation system according to claim 1, where in said selectable flow control means may be configured with one of several interfaces between the moveable member and fixed member, including but not limited to a disk interface, a slide interface, or a cylindrical interface.

10. A water and energy conservation system according to claim 1, wherein said selectable flow control means has its inlet and outlet ports configured to facilitate water conservation by directing water in said hot distribution conduit, to a cold water storage tank, under supply pressure, eliminating the need for said pump and said normally closed-to-flow solenoid valve and wherein the conserved water can be directed to and utilized in another water appliance, irrigation system or used for some other useful purpose.

11. A water and energy conservation system according to claim 1, having an energy saver segment, controlled by a single diverter valve, eliminating the need for a selectable flow control means, where energy conservation is the only goal.

12. A water and energy conservation system according to claim 1, having a water saver segment, controlled by a single diverter valve, eliminating the need for a selectable flow control means, where water conservation is the only goal.

13. A water and energy conservation system according to claim 1, where an array of three separate diverter valves are substituted for said selectable flow control means, where a first diverter valve controls the water saver cycle, a second diverter valve controls the use cycle and a third diverter valve controls the energy saver cycle.

14. A water and energy conservation system according to claim 1, useable in an existing structure, where the expense of retrofitting the structure is acceptable to the user.

15. A water and energy conservation system according to claim 1, configured with an electronic controller compatible with one of several home security systems interfaced with a computer or other programmable remote unit available with such a home security system.

* * * * *